(12) United States Patent
Kang et al.

(10) Patent No.: US 7,792,401 B2
(45) Date of Patent: Sep. 7, 2010

(54) OPTICAL WAVEGUIDE DEVICE AND OPTICAL COMMUNICATION MODULE

(75) Inventors: Hyun-seo Kang, Gwangju-si (KR);
Sei-hyoung Lee, Gwangju-si (KR);
Kwon-seob Lim, Gwangju-si (KR);
Jong-jin Lee, Gwangju-si (KR);
Jai-sang Koh, Gwangju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/410,743

(22) Filed: Mar. 25, 2009

(65) Prior Publication Data

US 2010/0021108 A1 Jan. 28, 2010

(30) Foreign Application Priority Data

Jul. 22, 2008 (KR) ...................... 10-2008-0071175

(51) Int. Cl.
*G02B 6/26* (2006.01)
*G02B 6/34* (2006.01)
*G02B 6/42* (2006.01)

(52) U.S. Cl. .......................... 385/31; 385/37
(58) Field of Classification Search .................. 385/31, 385/37
See application file for complete search history.

(56) References Cited

U.S. PATENT DOCUMENTS

| 4,760,569 | A | | 7/1988 | Mahlein | |
| 5,436,991 | A | * | 7/1995 | Sunagawa et al. | 385/37 |
| 5,760,391 | A | * | 6/1998 | Narendran | 250/227.14 |
| 6,850,665 | B2 | | 2/2005 | Grubsky et al. | |
| 7,162,124 | B1 | * | 1/2007 | Gunn et al. | 385/37 |
| 7,526,156 | B2 | * | 4/2009 | Lee et al. | 385/31 |
| 2002/0131727 | A1 | | 9/2002 | Reedy et al. | |
| 2004/0057647 | A1 | * | 3/2004 | Lyons | 385/12 |
| 2004/0175074 | A1 | * | 9/2004 | Dykaar | 385/37 |
| 2004/0240797 | A1 | | 12/2004 | Nagashima | |
| 2005/0185885 | A1 | * | 8/2005 | Onaka et al. | 385/24 |
| 2009/0022181 | A1 | * | 1/2009 | Atkins et al. | 372/6 |

OTHER PUBLICATIONS

Chen, W.T., et al., "Laser-to-Fiber Coupling Scheme by Utilizing a Lensed Fiber Integrated with a Long-Period Fiber Grating," IEEE Photonics Technology Letters, vol. 12, No. 5 (May 2000) pp. 501-503.

* cited by examiner

*Primary Examiner*—Daniel Petkovsek
(74) *Attorney, Agent, or Firm*—Blakely, Sokoloff, Taylor & Zafman LLP

(57) ABSTRACT

An optical waveguide device and an optical communication module are provided. In the optical waveguide device which includes a core and a cladding layer formed around the core and has one end formed to be inclined so as to refract input and output signals, the core includes therein a diffraction portion for diffracting an optical signal incident through the cladding layer to propagate straight through the core. Thus, it is possible to prevent deterioration of an optical signal coupling ratio in implementing a technique of transmitting optical signals in opposite directions.

13 Claims, 5 Drawing Sheets

OPTICAL WAVEGUIDE DEVICE AND OPTICAL COMMUNICATION MODULE

CROSS REFERENCE TO RELATED APPLICATION

This application claims priority from Korean Patent Application No. 10-2008-0071175, filed on Jul. 22, 2008, the disclosure of which is incorporated herein in its entirety by reference.

BACKGROUND OF THE INVENTION

1. Field of the Invention

The present invention relates to an optical waveguide device, and more particularly, to an optical waveguide device for switching paths of optical signals that are incident in opposite directions, and an optical communication module.

2. Description of the Related Art

Recently, an optical communication module including an optical waveguide formed of a polymer resin has been used as an optical communication component. The optical communication module includes a light-emitting device and a light-receiving device which are mounted on a substrate and an optical waveguide device, and these devices are adhered by an optical path material. In particular, the optical waveguide includes a lower protection layer, a cladding layer, and an upper protection layer. In the cladding layer, a core having a higher refractive index than the cladding layer is formed.

SUMMARY OF THE INVENTION

The present invention provides an optical waveguide device capable of preventing deterioration of an optical signal coupling ratio while switching optical signal paths for optical signals transmitted in opposite directions using one optical waveguide, and an optical communication module.

The present invention further provides an optical communication module performing beam focusing and optical coupling while switching paths of optical signals input in opposite directions.

Additional aspects of the invention will be set forth in the description which follows, and in part will be apparent from the description, or may be learned by practice of the invention.

The present invention discloses an optical waveguide device which includes a core and a cladding layer formed around the core and has one end formed to be inclined so as to refract input and output signals. The core includes therein a diffraction portion for diffracting an optical signal incident through the cladding layer to propagate straight through the core.

The present invention also discloses an optical communication module including: a light emitter including a light source and outputting an optical signal; a first optical waveguide device including a core including therein a diffraction portion for diffracting an optical signal incident through a cladding layer to propagate straight through the core and the cladding layer formed around the core, and having one end formed to be inclined so as to refract input and output signals; and a light receiver for receiving an optical signal output from the first optical waveguide device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
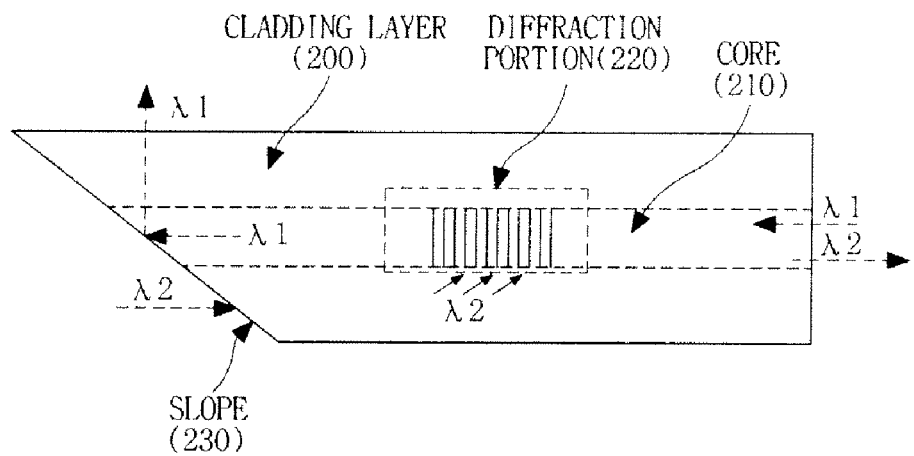
FIG. 1 shows a constitution of an optical waveguide device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 shows a constitution of an optical waveguide device according to an exemplary embodiment of the present invention. As illustrated, the optical waveguide device includes a core 210 and a cladding layer 200, and has one end formed to be inclined. The core 210 includes a diffraction portion 220 which diffracts an optical signal incident through the cladding layer 200 to propagate straight through the core 210. The end of the optical waveguide device, which is formed to be inclined so as to refract optical signals input and output to and from the optical waveguide device, will be referred to as a slope 230.

The optical waveguide device according to an exemplary embodiment of the present invention includes one of an optical fiber, a silicon optical bench, a polymer, and a planar optical waveguide, but is not limited thereto.

In the optical waveguide device having the core 210 and the cladding layer 200 according to an exemplary embodiment of the present invention, optical signals having different wavelengths existing in the core 210 can propagate in different directions. An optical signal propagating in one of the directions propagates into the core 210 and has a wavelength of $\lambda_1$. Another optical signal propagating in the other direction is input to the cladding layer 200 through the slope 230 and has a wavelength of $\lambda_2$. As illustrated in FIG. 1, the optical signal having the wavelength of $\lambda_1$ passes through the diffraction portion 220 and is output along a path switched by the slope

230. Here, the degree of change in the path of the optical signal having the wavelength of $\lambda_1$ may vary according to the angle of the slope 230.

Figure 2:
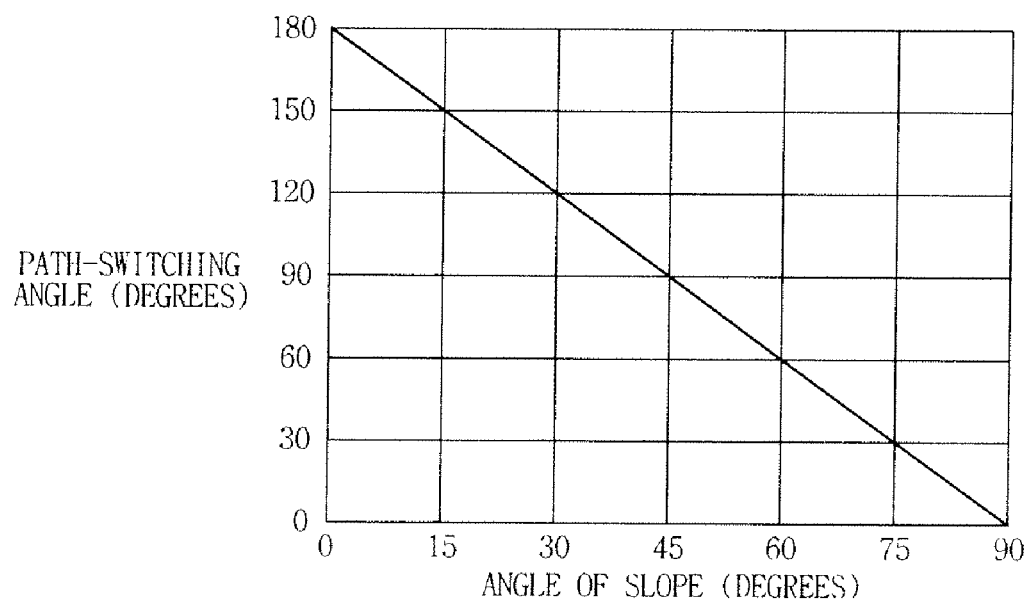
FIG. 2 is a graph showing a path-switching angle of an output wavelength according to an angle of a slope.

FIG. 2 is a graph showing a path-switching angle of an output wavelength according to the angle of the slope 230. As can be seen from the graph, the path-switching angle becomes 90° when the angle of the slope 230 is 45°. And, the path-switching angle becomes 120° when the angle of the slope 230 is 30°.

Figure 3:
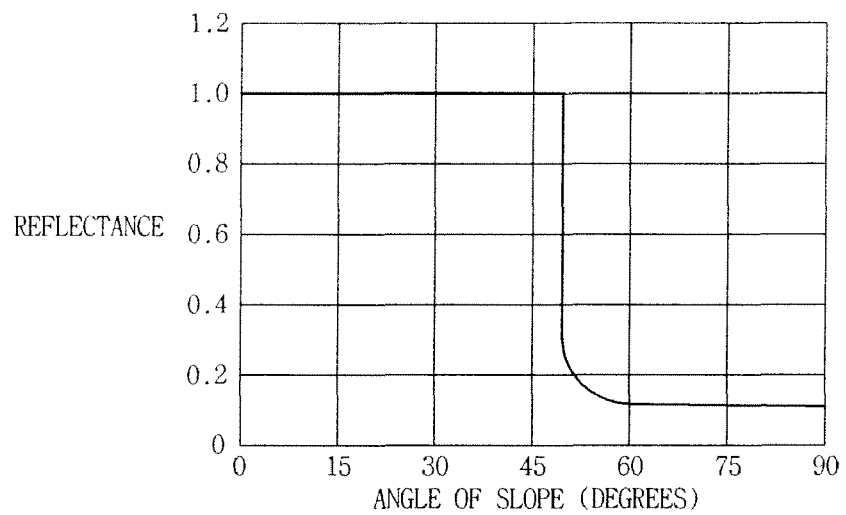
FIG. 3 is a graph of reflectance according to an angle of a slope.

FIG. 3 is a graph of reflectance according to the angle of the slope 230. As can be seen from the graph of FIG. 3, reflectance suddenly decreases when the angle of the slope 230 exceeds about 45°. For example, the reflectance is 1.0 when the angle of the slope 230 is 45°, but is about 0.1 when the angle of the slope 230 is 60°. In other words, when the angle of the slope 230 is 45° or more, about 90% of an optical signal is lost.

Meanwhile, in the optical waveguide device according to an exemplary embodiment of the present invention, the optical signal which propagates in the opposite direction of the optical signal having a wavelength of $\lambda_1$ and has a wavelength of $\lambda_2$, is focused on the cladding layer 200 and optically coupled into the core 210 by the diffraction portion 220. In other words, the optical signal having a wavelength of $\lambda_2$ and incident to the core 210 by the diffraction portion 220 and the optical signal having a wavelength of $\lambda_1$ propagate in opposite directions, and thus optical signals can be transmitted in both directions in the optical waveguide device.

The diffraction portion 220 according to an exemplary embodiment of the present invention is formed to have wide intervals and includes a long-period Bragg diffraction grating capable of selecting light within a specific wavelength range. In another exemplary embodiment of the present invention, the diffraction portion 220 may include a slanting Bragg diffraction grating having a large difference in refractive index. Thus, an optical signal incident through the cladding layer 200 can propagate to the core 210 after diffraction.

Figure 4:
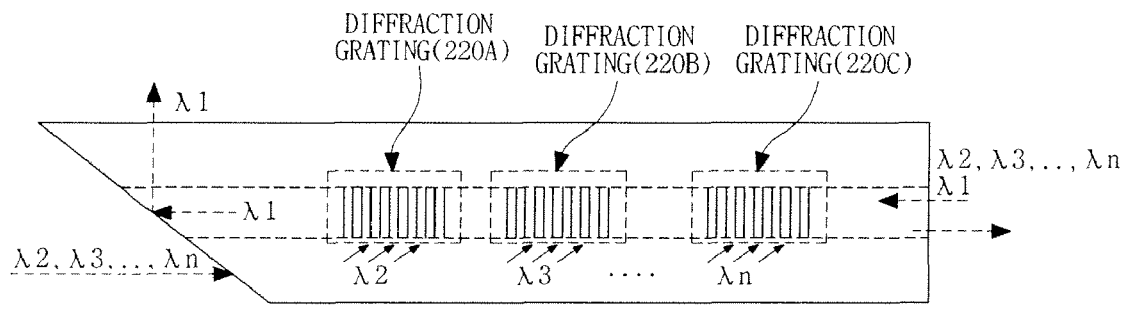
FIG. 4 shows a constitution of an optical waveguide device according to another exemplary embodiment of the present invention.

FIG. 4 shows a constitution of an optical waveguide device according to another exemplary embodiment of the present invention.

In the optical waveguide device according to this exemplary embodiment of the present invention, a diffraction portion includes a plurality of diffraction gratings 220A, 220B and 220C which diffract light having different wavelengths, respectively.

In the optical waveguide device including a core 210 and a cladding layer 200, an optical signal of a wavelength of $\lambda_1$ which propagates to the core 210 and is then transmitted among optical signals propagating in both directions, passes through the diffraction portion 220 capable of selecting a wavelength and is output along a path switched by the slope 230 to the outside. It is assumed that optical signals incident to the cladding layer 200 through the slope 230 have a plurality of wavelengths $\lambda_2, \lambda_3, \ldots, \lambda_n$.

The incident optical signals having wavelengths of $\lambda_2, \lambda_3, \ldots, \lambda_n$ are focused on the cladding layer 200 through the slope 230. Here, an optical signal having a wavelength of $\lambda_2$ is coupled to the core 210 by a diffraction grating 220a capable of selecting the wavelength, an optical signal having a wavelength of $\lambda_3$ is coupled to the core 210 by another diffraction grating 220b capable of selecting the wavelength, and an optical signal having a wavelength of $\lambda_n$ is coupled to the core 210 by still another diffraction grating 220c capable of selecting the wavelength. As a result, optical signals having different wavelengths can be optically coupled to the core 210 and simultaneously propagate in both directions in the optical waveguide device.

Figure 5:
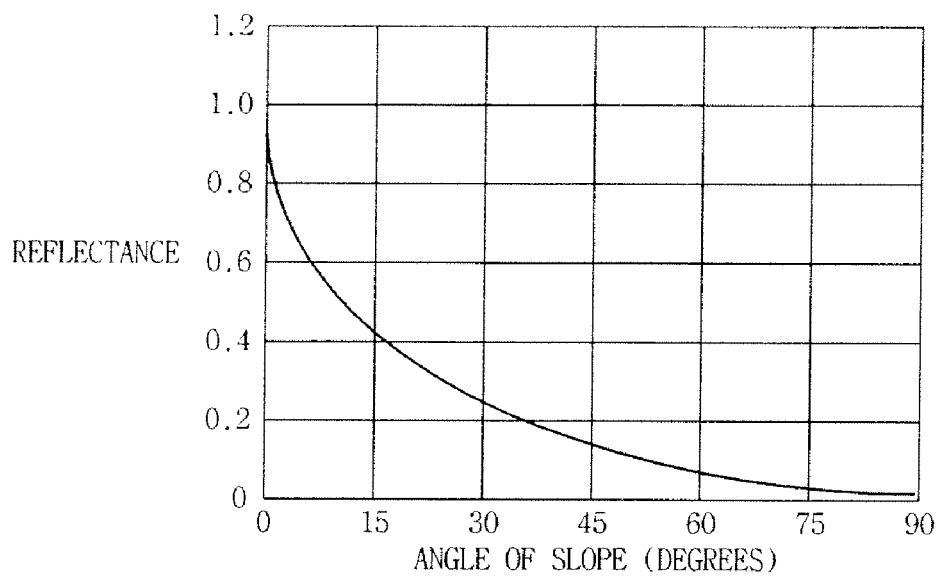
FIG. 5 is a graph of reflectance according to an angle of a slope when optical signals having different wavelengths are focused on a cladding layer of the slope.

FIG. 5 is a graph of reflectance according to the angle of the slope when optical signals having different wavelengths are focused on the cladding layer at the slope.

As illustrated, when the angle of the slope 230 is 45° or more, about 91.8%, i.e., a reflectance of 8.2%, of an input optical signal may be transmitted to the cladding layer 200. The slope 230 includes an anti-reflection (AR) coating layer on its one surface. Thus, transmittance of optical signals input and output through the slope 230 of the optical waveguide device may increase.

Figure 6:
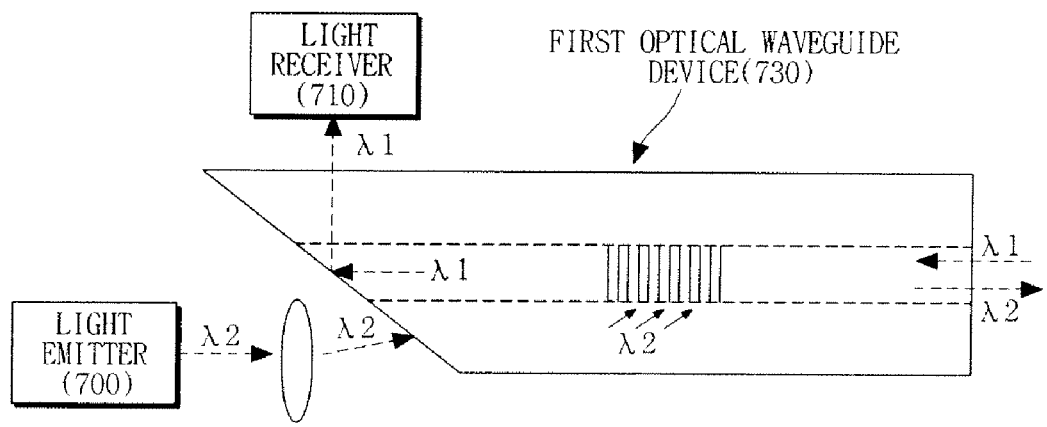
FIG. 6 shows a constitution of an optical communication module according to an exemplary embodiment of the present invention.

FIG. 6 shows a constitution of an optical communication module according to an exemplary embodiment of the present invention.

As illustrated, the optical communication module according to an exemplary embodiment of the present invention includes a light emitter 700, a first optical waveguide device 730 including a diffraction portion, a core and a cladding layer, and a light receiver 710.

In this exemplary embodiment, the light emitter 700 outputs optical signals having several different wavelengths. The cladding layer of the first optical waveguide device 730 is formed around the core, and the diffraction portion diffracts an optical signal, which is output from the light emitter 700 and incident into the core through the cladding layer, to propagate straight through the core. The first optical waveguide device 730 has already been described in detail above. The light receiver 710 receives optical signals output from the first optical waveguide device 730. Additionally, the optical communication module includes a lens 720 for propagating an optical signal having a specific wavelength and output is from the light emitter 700 to the cladding layer of the first optical waveguide device 730.

The flow of optical signals will be described in detail with reference to FIG. 6. An optical signal of a wavelength of $\lambda_1$ which propagates to the core and is then transmitted, passes through the diffraction portion and is incident to the light receiver 710 along a path switched by a slope. Meanwhile, an optical signal, which has a wavelength of $\lambda_2$ and is output from the light emitter 700, is focused on the cladding layer of the first optical waveguide device 730 through the lens 720. The optical signal which has a wavelength of $\lambda_2$ and propagates to the cladding layer is optically coupled into the core by the diffraction portion and propagates. Here, the optical signal having a wavelength of $\lambda_2$ can be transmitted from the core to the propagation direction of the above-mentioned optical signal having a wavelength of $\lambda_1$.

Figure 7:
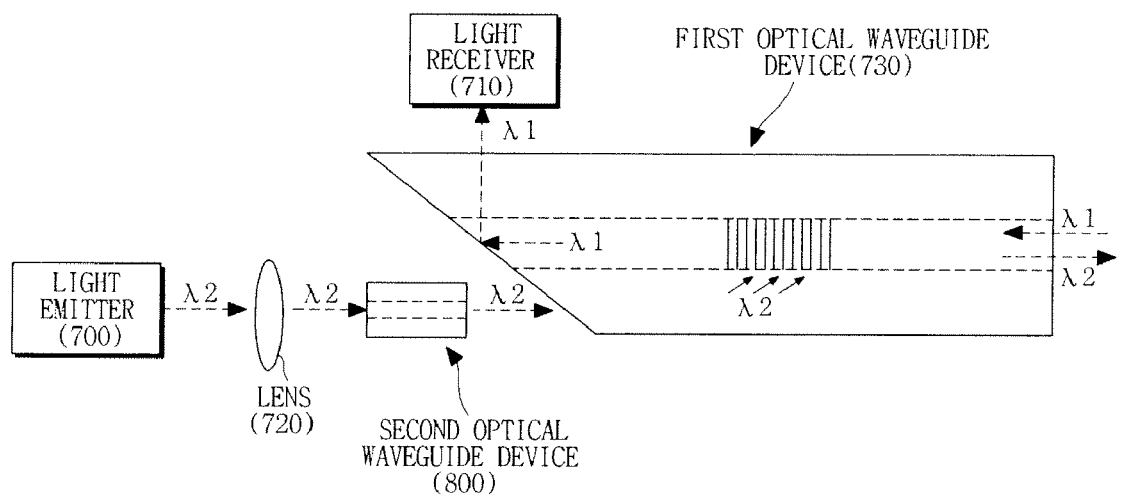
FIGS. 7 and 8 show constitutions of an optical communication module according to another exemplary embodiment of the present invention.
Figure 8:
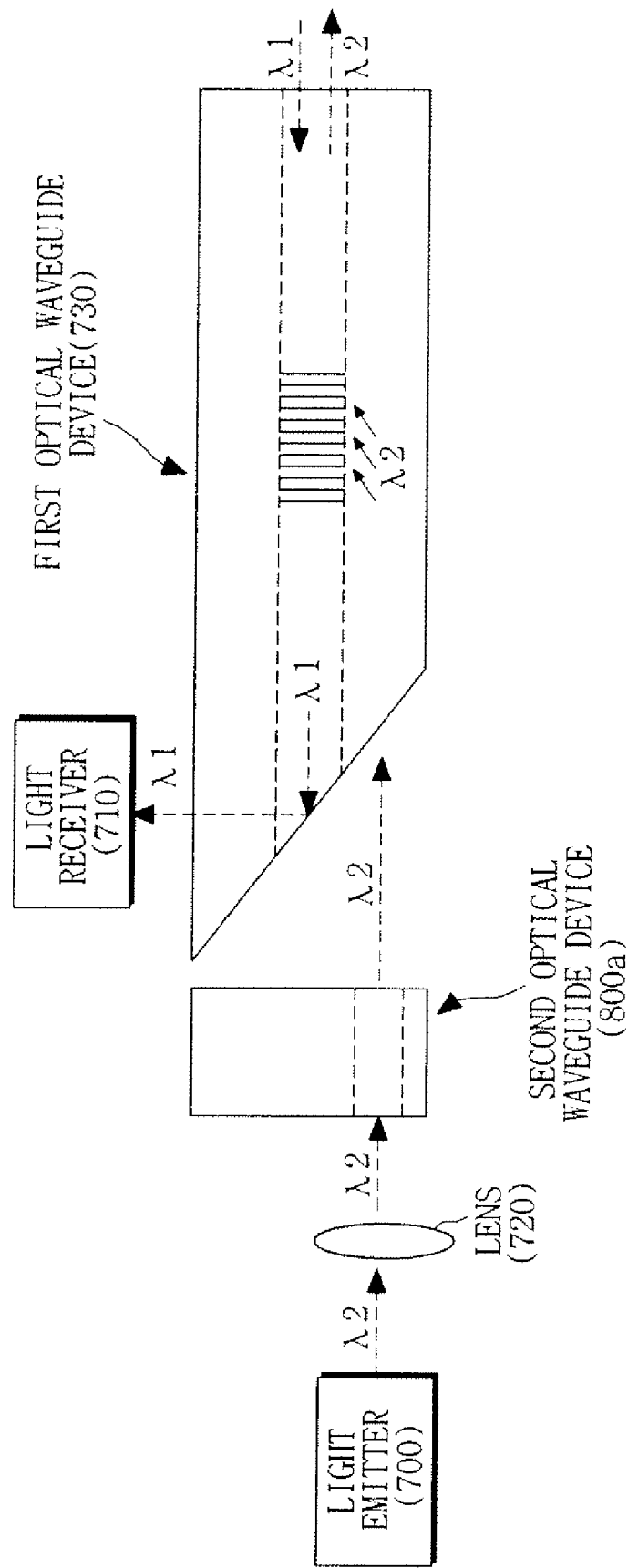

FIGS. 7 and 8 show constitutions of an optical communication module according to another exemplary embodiment of the present invention.

As illustrated, the optical communication module according to another exemplary embodiment of the present invention additionally includes a second optical waveguide device 800 between the light emitter 700 and the first optical waveguide device 730. The second optical waveguide device 800 has a different amount of core and cladding layer from those of the first optical waveguide device 730.

An optical signal, which has a wavelength of $\lambda_2$ and is output from the light emitter 700, is focused on the second optical waveguide device 800 having a core and a cladding layer. And, the optical signal having a wavelength of $\lambda_2$ is transmitted through the second optical waveguide device 800 and output to a slope of the first optical waveguide device 730. The optical signal having a wavelength of $\lambda_2$ is focused on the cladding layer of the first optical waveguide device 730 through the slope of the first optical waveguide device 730 and then is optically coupled into the core through the diffraction portion. As illustrated in FIG. 8, a core and a cladding layer of a second optical waveguide device 800a may have various sizes. In other words, the core and the cladding layer of the second optical waveguide device 800a may be implemented to have an asymmetric structure.

An optical communication module according to still another exemplary embodiment of the present invention additionally includes a third optical waveguide device for focusing optical signals output from a first optical waveguide device 730. In other words, the optical communication module may be implemented to focus and transmit an optical signal output from the first optical waveguide device 730.

Additionally, the optical communication module may include a fixing substrate including a fixing groove for mounting and fixing the light emitter 700 and the first optical waveguide device 730 therein, and a bump for fixing the light receiver 710 to the first optical waveguide device 730 by bonding. In this case, the fixing groove may be a V-groove fabricated in a V-shape or a U-groove fabricated in a U-shape. However, the present invention is not limited to these shapes.

According to exemplary embodiments of the present invention, it is possible to prevent deterioration of an optical signal coupling ratio while implementing a technique of transmitting optical signals in both directions of one optical waveguide device.

In addition, since an optical signal output from a light-emitting device is focused on a wide cladding region, the alignment tolerance of an optical waveguide device is relatively large, and passive alignment is enabled. Consequently, exemplary embodiments of the present invention facilitate mass production and reduce production cost.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An optical waveguide device comprising a core and a cladding layer formed around the core, said cladding layer having one end formed to be inclined and an anti-reflection coating layer formed on said one end so as to refract input and output signals,
wherein the core includes therein a diffraction portion for diffracting an optical signal incident through said one end of the cladding layer, said cladding layer and said diffracting portion being configured such that said incident signal is propagated parallel to the core.

2. The optical waveguide device of claim 1, wherein the diffraction portion includes a long-period Bragg diffraction grating capable of selecting light within a specific wavelength range.

3. The optical waveguide device of claim 1, wherein the diffraction portion includes a slanting Bragg diffraction grating having a large difference in refractive index.

4. The optical waveguide device of claim 1, wherein the diffraction portion includes a plurality of diffraction gratings which diffract light having different wavelengths, respectively.

5. The optical waveguide device of claim 1, which comprises one of an optical fiber, a silicon optical bench, a polymer, and a planar optical waveguide.

6. The optical waveguide device of claim 1, wherein the end is formed to be inclined at an angle of 45° or less.

7. An optical communication module, comprising:
a light emitter including a light source and outputting an optical signal;
a first optical waveguide device comprising a core and a cladding layer formed around the core, said cladding layer having one end formed to be inclined and an anti-reflection coating layer formed on said one end so as to refract input and output signals,
wherein the core includes therein a diffraction portion for diffracting an optical signal incident through said one end of cladding layer, said cladding and said diffracting portion being configured such that said incident signal is propagated parallel to the core; and
a light receiver for receiving an optical signal output from the first optical waveguide device.

8. The optical communication module of claim 7, further comprising:
a second optical waveguide device disposed between the light emitter and the first optical waveguide device.

9. The optical communication module of claim 8, further comprising:
a third optical waveguide device for focusing optical signals output from the first optical waveguide device.

10. The optical communication module of claim 7, wherein the light emitter emits one or more optical signals having different wavelengths.

11. The optical communication module of claim 7, further comprising:
a lens disposed between the light emitter and the first optical waveguide device.

12. The optical communication module of claim 7, further comprising:
a fixing substrate including a fixing groove for mounting and fixing the light emitter and the first optical waveguide device therein; and
a bump for fixing the light receiver to the first optical waveguide device.

13. The optical communication module of claim 12, wherein the fixing groove is a V-groove or a U-groove.

* * * * *